Patented Nov. 2, 1926.

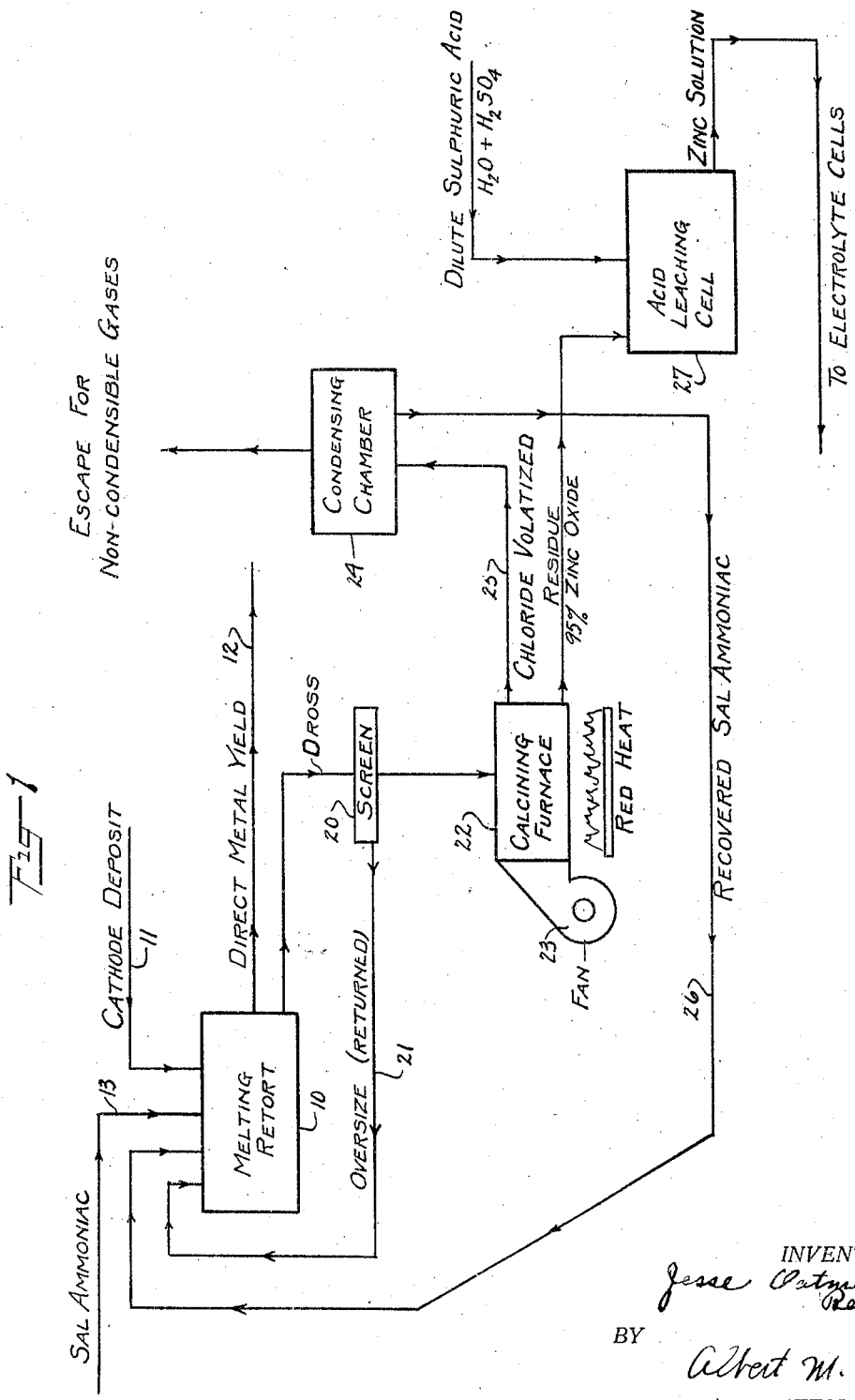

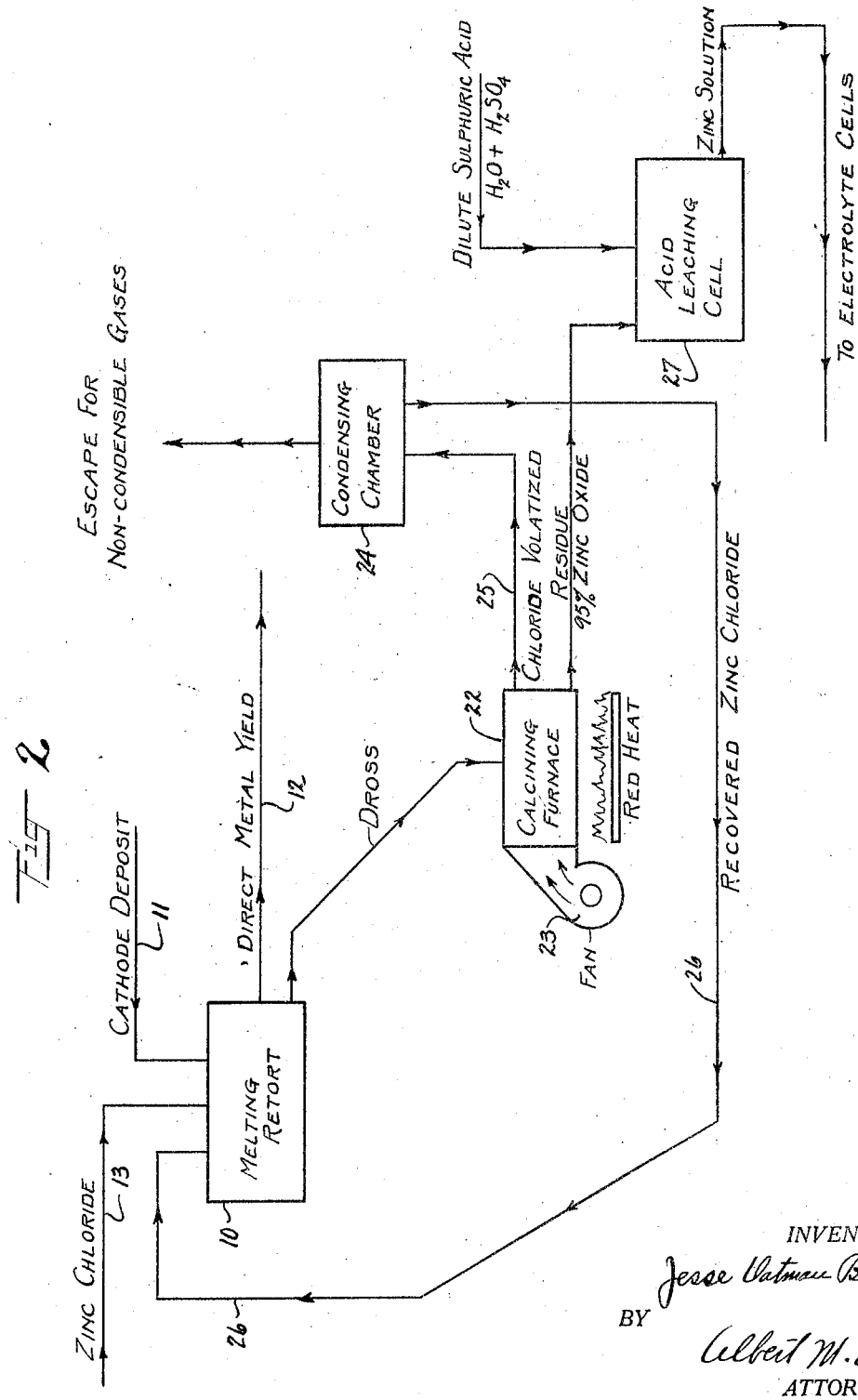

1,605,640

UNITED STATES PATENT OFFICE.

JESSE OATMAN BETTERTON, OF OMAHA, NEBRASKA, ASSIGNOR TO AMERICAN SMELTING AND REFINING COMPANY, OF NEW YORK, N. Y., A CORPORATION OF NEW JERSEY.

RECOVERY OF ZINC AS SULPHATE FROM DROSS.

Application filed June 28, 1923, Serial No. 648,194. Renewed April 20, 1926.

This invention relates to the art of metal recovery, and has particular reference to improvements in recovering zinc as sulphate from the dross produced in melting zinc.

The present invention has for its main object the utilization of materials heretofore wholly or partly wasted. In accordance with this object a practicable method is provided in which there is substantially no chlorine left in the zinc solution recovered to interfere with the successful operation of the electrolytic cell in which the recovered zinc solution is placed to deposit the zinc.

Other objects relate to the recovery of the flux used in the process so that the operation is cyclic, only enough of the flux being added to the initial charge to compensate for handling losses; to reduction of the cost of installation and maintenance of a plant for the recovery of valuable metals to a minimum; and to oxidization of the carbon particles in case carbon was used in the original melt of the zinc strippings.

Various other objects and advantages of the invention will be in part obvious from an inspection of the accompanying drawings and in part will be more fully set forth in the following particular description of one form of practicing my invention, and the invention also consists in certain new and novel features hereinafter set forth and claimed.

In the accompanying drawings,

Figure 1 is a flow sheet of the several steps of one process embodying features of the invention; and Figure 2 is a flow sheet of the several steps of an alternative process embodying features of the invention.

Referring to Figure 1, there is shown in diagrammatic form a usual melting retort 10 of a zinc refinery into which there is introduced cathode deposit indicated at 11 and from which there is a yield of metallic zinc indicated at 12, usually not greater than about 90% by weight of the cathode deposit melted down. An initial charge of flux such as sal-ammoniac indicated at 13 is added to the retort. The present invention has no reference to this well-known process, only so much of the flow sheet relating thereto being shown as is necessary to an understanding of the invention. The invention refers particularly to the treatment of the dross produced in the melting retort 10 and which may be removed therefrom at desired times. It has been found to consist mainly of oxidized zinc, some metallic zinc and chlorides.

In order that the present invention may be better understood, a brief description will be given of the processes heretofore unsuccessfully employed in the attempt to recover the valuable constituents of the dross removed from the metal bath. Such processes have included re-treatment of the dross with further additions of sal-ammoniac, but even with the exercise of the utmost care, at least 4% of the original weight of cathode deposit will still remain as final dross. Upon attempting to leach this final dross with liquid containing dilute sulphuric acid, it has been found that the resulting solution, although it contains much of the zinc left in the final dross in solution, cannot be added to the solution which is used for replenishing the electrolyte of the electrolytic cells because of the chlorine contents. The result would be the fouling of the whole cell with chlorides, and the electrolytic deposition of the zinc could not be satisfactorily accomplished with lead anodes. Such prior methods have therefore not come into commercial use.

According to the present invention the dross is screened in a suitable screen 20, and the oversize screenings returned to the melting retort 10 by way of path 21 and charged into the next melt of cathode zinc deposit. I have found a so-called six-mesh screen suitable for the purpose. The dross passing the screen is calcined at a red heat in a suitable muffle, roasting or calcining furnace 22 of well-known construction. This serves to volatilize the chlorine contents of the dross mainly as volatile metallic chlorides, which are readily recovered by the use of an ordinary fan 23 for maintaining a small movement of gases through the furnace 22, followed by passing or conducting the sublimed chlorides to a condensing chamber 24, through a conducting passage 25. The chlorine contents are volatilized, and any fine particles of metallic zinc are oxidized, as are also any carbon particles in case carbon was used in the original melt of zinc stripping. The gaseous oxides of carbon pass off with the other volatile matter. The chlorides recovered in this manner are returned over a path 26 to the melting retort 10, for use as a flux with a succeeding melt of cathode zinc, replacing an equal amount of fresh sal-ammoniac supplied over the path 13, which would otherwise be required. The non-condensible gases escape through exit openings provided for the purpose, preferably to and through a stack. If desired the gases from the condensing chamber may be directed through bags, in order to insure practically complete recovery of all the volatile chlorides.

It is to be understood that in the volatilizing and condensing of the chlorides that substantially all of the zinc chloride is always condensed in the condensing chamber and that the ammonium chloride may when desired be also condensed. But it is to be further understood that the condensing temperature may be such as to condense the zinc chloride without condensing the ammonium chloride. As is well known in the art there is sufficient difference in the volatilizing and condensing temperatures of these two chlorides to permit their separation in this manner when desired.

The residue remaining in the calcining furnace 22 has been found to be practically free of all chlorine, and usually consists of a readily acid leachable zinc oxide, containing 95% or more zinc oxide. This is now leached in a leaching cell 27 of well-known construction, with liquid containing dilute sulphuric acid, and thereafter added to the electrolyte in the electrolytic cell (not shown) used in the electrolytic deposit of zinc, with none of the detrimental results previously explained.

In the form of the invention diagrammatically illustrated in Figure 2, the flux employed in the melting retort 10 is zinc chloride. The slag absorbs moisture to an excessive degree, and the screening operation above described is impractical. The dross is therefore passed directly to the calcining furnace 22, and the process from this point forward is similar to that described for Figure 1, and requires no further detailed description.

Thus it will be seen that I have provided a process for the substantially complete recovery of zinc from zinc dross with no chlorine remaining in the recovered material and thus the operation of the cells to which the recovered material may be added is continued in the usual manner. The flux is returned to the melting retort, and thus the operation is cyclic. The cost of operation may thus greatly be reduced.

While I have shown and described and have pointed out in the annexed claims certain novel features of my invention, it will be understood that various omissions, substitutions and changes in the several steps of my process and in its operation may be made by those skilled in the art without departing from the spirit of the invention.

Having thus described my invention, I claim:

1. In the art of metallurgy, the process for the recovery of valuable compounds from zinc dross, which consists in heating the dross to volatilize the flux residue and oxidize metallic zinc carried therein.

2. In the art of metallurgy, the process for the recovery of valuable compounds from zinc dross, which consists in screening the dross, heating the screened fines, volatilizing the flux and oxidizing the carbon and metallic zinc, passing the flux and oxide of carbon to a condensing chamber and condensing the flux therein, and subjecting the residue to a leaching operation.

3. In the art of metallurgy, the process of treating zinc dross, which consists in heating the dross to a red heat to volatilize the flux and burn the carbon contained in the dross, passing the volatilized products to a condensing chamber, condensing the flux therein, and passing the flux to a melting bath.

4. The process of treating zinc dross to recover valuable compounds therefrom, which consists in screening the dross to separate fines from fused particles, heating the dross to a temperature sufficient to volatilize the chlorides in the mass, oxidizing the metallic zinc and leaching the zinc oxides to recover metallic zinc as sulphate.

5. In the art of metallurgy, the process for the recovery of valuable compounds from zinc dross, which consists in heating the dross in a melting bath to separate the volatilizable constituents, passing the volatilized product to a condensing chamber, and condensing the flux and any zinc compounds formed therefrom therein, and passing the condensate to the said melting bath.

6. In the art of metallurgy, the process of treating zinc dross which consists in screening the dross, heating the screened fines, collecting volatilized products therefrom, and recovering the flux from the volatilized products.

7. The process of treating zinc dross to recover valuable compounds therefrom, which consists in heating the dross to a red heat to separate volatilized products from the heated dross, collecting the said volatilized products, and condensing the flux from the volatilized products.

8. The process of treating zinc dross to recover valuable compounds therefrom, which consists in mixing the dross with a flux containing the element chlorine, heating the mixture to separate volatile matter therefrom, collecting the volatile matter, and condensing the flux from the volatile matter.

Signed at Omaha in the county of Douglas and State of Nebraska this 6th day of June A. D. 1923.

JESSE OATMAN BETTERTON.